United States Patent [19]
Foster

[11] Patent Number: 5,157,776
[45] Date of Patent: Oct. 20, 1992

[54] HIGH SPEED MEMORY FOR MICROCOMPUTER SYSTEMS

[75] Inventor: Mark J. Foster, Stevensville, Mich.

[73] Assignee: Zenith Data Systems Corporation, Buffalo Grove, Ill.

[21] Appl. No.: 426,489

[22] Filed: Oct. 23, 1989

Related U.S. Application Data

[63] Continuation of Ser. No. 139,685, Dec. 30, 1987, abandoned.

[51] Int. Cl.⁵ .............................................. G06F 12/00
[52] U.S. Cl. ...................... 395/425; 364/239.8; 364/243.41; 364/251; 364/252; 364/959.1; 364/960; 364/965.9; 364/244.8; 364/DIG. 1; 395/400
[58] Field of Search ... 364/900 MS File, 200 MS File; 365/239, 240; 395/425, 400

[56] References Cited

U.S. PATENT DOCUMENTS

| | | | |
|---|---|---|---|
| 4,402,067 | 8/1983 | Moss et al. | 365/219 |
| 4,633,441 | 12/1986 | Ishimoto | 365/189 |
| 4,639,890 | 1/1987 | Heilveil et al. | 364/900 |
| 4,654,804 | 3/1987 | Thaden et al. | 364/520 |
| 4,663,735 | 5/1987 | Novak et al. | 364/900 |
| 4,689,741 | 8/1987 | Redwine et al. | 364/200 |
| 4,718,039 | 1/1988 | Aichelmann et al. | 364/900 |

Primary Examiner—Thomas C. Lee
Assistant Examiner—Ayni Mohamed
Attorney, Agent, or Firm—Leydig, Voit & Mayer

[57] ABSTRACT

A method and main memory system that provides a processor cache includes. Dual-port random access memory devices used for main memory, with one port providing typical random access and a second port being associated with an internal shift register that contains sequential instruction words. Improved system speed can be achieved by virtue of the shorter access time of the second port. A preferred embodiment is adapted to employ conventional video random access memory devices as constituents of a main memory system with unique control methods.

14 Claims, 1 Drawing Sheet

HIGH SPEED MEMORY FOR MICROCOMPUTER SYSTEMS

This application is a continuation of application Ser. No. 139,685, filed Dec. 30, 1987, now abandoned.

BACKGROUND OF THE INVENTION

The present invention relates generally to the computer art. More particularly, the present invention relates to microcomputer main memory systems. Specifically, the present invention provides an improved memory system incorporating dual-port random access memory devices.

Microcomputer main memory systems typically incorporate dynamic random access memory (DRAM) devices. These devices store both instruction words and data words for use by the central processing unit (CPU). When an instruction word or data word is needed by the CPU, a memory access cycle is initiated. To complete this cycle, a finite time interval is needed, typically on the order of 200 nanoseconds, and this interval is dictated by the characteristics of the DRAM. During this interval the CPU is forced to wait for the DRAM to respond.

In order to overcome delays associated with memory access, sophisticated computer systems have employed a memory cache. A cache is a small block of extremely high speed memory used as a temporary holding buffer for information which is likely to be accessed by the CPU. Cache memory is much more expensive than DRAM devices and is thus used in limited quantity. When the CPU fetches information from main memory, the cache is first checked to determine if the information which is being fetched is already present in the cache. If so, the information is routed directly from the cache to the processor with very little delay. Otherwise, it is necessary to perform a slower access to main memory for the desired information. Such access also results in updating the cache with the information stored in main memory locations located nearby the most recently accessed main memory word. In theory, it is this information that is most likely to be subsequently accessed and, thus, will be present in the cache for quick access.

The cache system works well where the CPU is repeatedly accessing words within a small block, such as a small program segment. As programs grow larger, however, the probability of a desired word at any time being in the cache decreases for a given cache size. Consequently, performance suffers since a larger portion of memory accesses will be spent loading instructions from main memory to the cache, rather than usefully manipulating data. A larger cache can remedy this, but at a great increase in system cost.

Accordingly, a principal object of the present invention is to provide a high speed main memory system that generally overcomes the deficiencies of the prior art.

A more detailed object of the present invention is to provide a simplified cache that is low cost and thus adaptable for microcomputer use.

Yet another object lies in providing a cache that exploits the generally sequential nature of instruction access events.

The present invention generally utilizes a video RAM memory device in association with a main memory unit for a micro-computer system. Through the use of the V-RAM, random access may be provided to dynamic RAM cells or the content of the cells may be sequentially read from the memory. In conjunction with the V-RAM, a multiplexer provides for selection of the appropriate output from the memory. Additionally, a controller controls the transfer of data from the V-RAM and also controls the operation of the multiplexer device. Additional features are embodied in the use of a latch for storing the address of an immediately, previously executed word. In association with the latch, an incrementor responsive to the contents of the latch may develop an address corresponding to an instruction word physically located upwardly and adjacent to the immediately, previously executed word. In association with the latch and the incrementor, a comparator may evaluate the coincidence between the developed address value and a current instruction word address. The output of the comparator then controls whether the contents of a shift register are modified or not. If there is an address match, the next instruction is read from a sequential output port; if not, the next instruction is retrievely conventionally. A corresponding method for implementation of the invention of the present application generally comprises comparing the address of an instruction word with the incremented address of an immediately, previously executed word and then shifting the contents of an associated shift register for output. The appropriate instruction at a serial port.

The appended claims set forth the features of the present invention with particularity. The invention, together with its objects and advantages, may be best understood from the following detailed description taken in conjunction with the accompanying drawings of which:

DETAILED DESCRIPTION OF THE INVENTION

Figure 1:
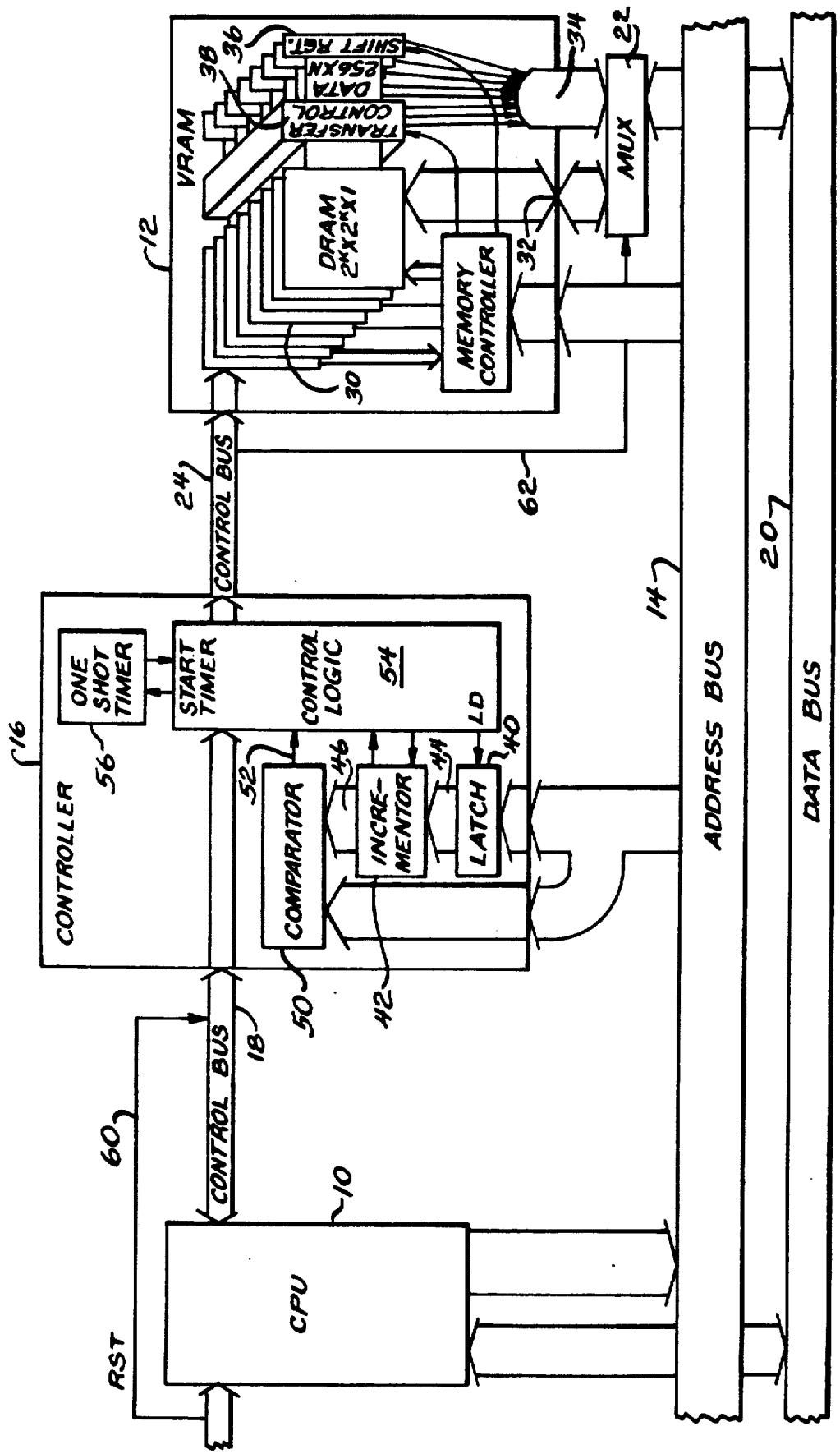
FIG. 1 is a general block diagram of a computer system employing a memory system according to the present invention.

The present invention accomplishes the above and other objects through the incorporation of dual-port random access memory devices as constituents of a main memory system in a microcomputer. Such dual-port devices are constructed with two data ports. One data port is similar to the data port on a typical DRAM device, a random access read/write interface where a single memory location is read or modified in each access cycle. The second data port is a high speed serial access port which allows words in a block of data to be read sequentially at speeds typically ten times faster than would be possible via the conventional random access interface. Standard dual-port devices have been developed for use as video random access memory (VRAM) and are currently widely available and widely used for video memory. The preferred embodiment, therefore, of the present invention utilizes VRAM components, but through unique control methods adapts such components to be used as main memory functioning as an integral high speed processor cache.

Referring now to the drawing, FIG. 1 illustrates a computer system according to a preferred embodiment of the present invention. A CPU 10 communicates with VRAM 12 via an address bus 14. The CPU 10 also communicates with a controller 16 via the address bus 14 and a controller control bus 18. The CPU 10 further communicates with the VRAM 12 via a data bus 20 through a multiplexer 22. The controller 16 communicates with the VRAM 12 and the multiplexer 22 via a VRAM control bus 24.

The VRAM 12 consists of one or more VRAM devices, or other dual-port random access memory devices, organized as a memory system. A typical VRAM device may itself be organized as an array of memory cells having the dimensions 256 bits by 256 bits by 4 bits. Such a typical device would have a capacity equal to 65,536 words, with each word consisting of 4 bits. The VRAM 12 of the preferred embodiment, shown in FIG. 1, is organized as a memory system having an 8-bit word. Thus, if constructed of typical VRAM devices as described above, the VRAM 12 of the preferred embodiment would use two of such devices per 65,356 words of capacity.

For purposes of illustration only, the VRAM 12 of the preferred embodiment is shown as having an 8-bit word. It is to be understood that a VRAM memory system according to the invention can be constructed with a word length of any number of bits, and it can be constructed of VRAM devices, or other dual-port random access memory devices, each having the capacity to store items of data one or more bits in length.

For clarity and simplicity, the invention is described as employing a single VRAM device having a capacity of 65,536 words, each word of 8-bit length. In practice, however, as is common in the art, a number of devices may be needed to achieve an 8-bit word. And further, the overall system capacity may be expanded beyond 65,536 words by adding more devices in the usual way. Thus, the VRAM 12 is shown as having eight memory matrices 30, each matrix 30 having 256 rows and 256 columns with 1 bit being accessible at each row-column location.

The VRAM 12 is equipped with a conventional random access read/write data port 32 and a high speed serial access port 34. The VRAM 12 typically can support a single transfer via the random access port 32 approximately every 300 nanoseconds. Therefore, it would be possible to transfer approximately 3.3 million words per second via the random access port 32. Each of such words could be read randomly from any memory location within the VRAM 12.

The serial access port 34 of the VRAM 12 is coupled to a shift register 36 within the VRAM 12. The shift register 36 is internally connected to the memory matrices 30 of the VRAM 12 in such a manner that it can be used to directly copy the contents of an entire row within the matrices 30 via a single special access of the random access port 32. Loading an entire row of the matrices 30, a row being 256 words in the preferred embodiment, into the shift register 36 requires approximately 300 nanoseconds, the time required for a single access via the random access port 32, and is controlled by a transfer controller 38 which is disposed between memory matrices 30 and the shift register 36. Once the shift register 36 is loaded, the contents of the shift register 36 can then be sequentially accessed via the serial access port 34 at a rate approximately ten times faster than is possible via the random access port 32. Although the serial access port 34 provides faster access, words must be accessed sequentially rather than randomly as is possible via the random access port 32.

According to the invention, the dual-port nature of the VRAM 12 is uniquely adapted to correspond to the two types of information commonly stored in main memory, useful data and program instructions. Data words are typically accessed in a random fashion; thus data will be accessed via the random access port 32. Instruction words, however, tend to be accessed in a highly sequential fashion; thus instructions will be accessed via the serial access port 34. Consequently, the shift register 36 and the serial access port 34 act as a cache for instruction words, greatly enhancing execution speed, while data words remain accessible in the usual way.

The CPU 10 is of the conventional type and provides control information on the controller control bus 18 consisting of a cycle output (CYC) which indicates the initiation of a memory access and an instruction output (INS) which indicates that an instruction word, as opposed to a data word, is being accessed. The CPU 10 further provides an address on the address bus 14 representing the location of the word being accessed.

A latch 40 is part of the controller 16 and is used as a very small memory, the purpose of which is to retain the address of an instruction word that was immediately previously accessed and executed by the CPU 10. This latched address is then incremented by an incrementor 42 to develop an address value that corresponds to the instruction word located upwardly adjacent in physical memory to the instruction word whose address is retained in the latch 40. In function, the incrementor 42 receives an input value, shown at 44, from the latch 40 and outputs the input value plus one, shown at 46, representing the next sequential address following the address of the most recent instruction access.

Whenever the CPU 10 accesses an instruction, the address of that instruction, present on the address bus 14, is compared with the output of the incrementor 42, shown at 46, by a comparator 50. If coincidence exists, the comparator 50 will generate a signal indicating such coincidence, shown at 52, which will cause the multiplexer 22 to couple the serial access port 34 with the data bus 20 allowing the CPU 10 to quickly receive the instruction via the serial access port 34.

Control logic 54 is part of the controller 16 and coordinates the other elements of the controller 16 and receives control signals from the CPU 10 via the controller control bus 18 and generates signals, shown at 24, to control the multiplexer 22 as well as elements of the VRAM 12 such as the shift register 36 and the transfer controller 38.

A timer 56 is part of the controller 16 and is used to indicate a situation in which the serial access port 34 has not been accessed often enough i order to maintain the integrity of the data present at the serial port 34. Each time the CPU 10 accesses an instruction, the timer 56 is reset. In the absence of instruction requests by the CPU 10, the timer 56 counts. If no instruction access occurs prior to the expiration of a predetermined timing interval, 40 microseconds in the preferred embodiment, the output of the timer 56 will be set. When the CPU 10 then finally does request an instruction, the control logic 54 will force the shift register 36 to be reloaded prior to allowing the serial port 34 to be accessed.

In operation, the CPU 10 is initialized via a reset line 60. The reset line 60 is coupled to the controller 16 such that a reset status is further recorded in a reload flag register (not shown) within the control logic 54. As the CPU 10 completes its initialization, it will then begin executing instructions from nonvolatile read-only memory (ROM) (not shown) external to the VRAM 12. For purposes of this description, the instructions executed in ROM serve to load the VRAM 12 with code intended to be subsequently run by the CPU 10. This loading process may occur either directly via the CPU 10, or indirectly via a Direct Memory Access (DMA) controller (not shown) in the usual manner. In either case, this operation is performed solely through the random access port 32, as though the VRAM 12 were conventional DRAM.

Once the VRAM 12 has been loaded with executable code, the CPU 10 will then begin to execute instructions contained in it. When the CPU 10 first requests information from the VRAM 12, several events occur. To initiate the request, the CPU 10 will assert an address on the address bus 14 which falls within the VRAM 12, along with the INS control line of the controller control bus 18 which indicates an instruction transfer, and the CYC control line of the controller control bus 18 will go active indicating the start of a memory transfer. At this stage, the CPU 10 is waiting for a response from the control logic 54 indicating that data has been placed on the data bus 20 by the VRAM 12.

As the CYC control line of the controller control bus 18 goes active, the control logic 54 will determine that a transfer via the serial access port 34 is to be performed since the INS control line indicates that an instruction fetch is taking place. As soon as this occurs, the multiplexer control line 62 is asserted in order to configure the multiplexer 22 so that the data bus 20 is connected to the serial access port 34. At the same time, the controller 16 checks the status of the VRAM 12. For the first VRAM instruction fetch following a reset, the reload flag register will indicate that the information present at the serial access port 34 is invalid (the issuance of the reset line 60 forces this condition). The reload flag register being set causes the VRAM 12 to begin a normal access via the random access port 32, but an XFER control line of the VRAM control bus 24, set active by the control logic 54, will indicate to the VRAM 12 that, in the cycle being performed, an entire row of the memory matrices 30 should be transferred to the shift register 36. The row to be transferred is the row containing the information being accessed via the random access port 32.

As soon as the VRAM 12 completes the memory read cycle which loads the shift register 36, the reload flag register will be cleared, indicating that the information present at the serial access port 34 is now available for use. As this occurs, the control logic 54 asserts a pulse via the VRAM control bus 24 to a serial clock input of the VRAM 12 which gates the first word from the shift register 36 so as to expose the word at the serial access port 34. This operation is actually performed as an integral part of the special shift register transfer cycle described above. Upon completion of this cycle, the VRAM 12 will expose the instruction information at the serial access port 34, such information passing through the multiplexer 22 and onto the data bus 20 for transfer to the CPU 10. Once the instruction information is known to be valid (a function of the access time of the VRAM component), the control logic 54 will assert a "ready" pulse to the CPU 10 via a ready line of the controller control bus 18 indicating that the CPU 10 may then proceed.

During the execution of the shift register transfer cycle (the reload cycle) described above, the CPU 10 was held in a waiting condition. With the CPU 10 receiving a ready status from the control logic 54, it proceeds with the next bus access. During this period between instruction accesses, the control logic 54 is already preparing for the next instruction request. After the ready line is asserted, the controller 16 quickly performs the following functions: 1) the address of the immediately previously executed instruction is stored in the latch 40; 2) the serial clock input of the VRAM 12 is pulsed in order to shift the sequentially next instruction word in the shift register 36 to the serial access port 34, the next instruction word being physically located in memory upwardly adjacent to the previously executed word; and 3) the incrementor 42 adds one to the contents of the latch 40, thus generating an address value corresponding to the sequentially next instruction word.

As the controller 16 performs the above functions, the CPU 10 may begin another bus access. If the access is not an instruction request to the VRAM 12, the control logic 54 will simply switch the multiplexer 22 via the multiplexer control line 62 so that the data bus 20 is coupled to the random access port 32. If the access is an instruction request to the VRAM 12, however, the controller 16 must still determine whether the instruction being fetched is that which is currently exposed at the serial access port 34. This determination is made by the comparator 50 which compares the address value developed by the incrementor 42 with the address of the instruction word presently being requested by the CPU 10. If the two are not equal, coincidence is absent, indicating that the CPU 10 is performing a non-sequential access. When this occurs, the controller 16 must reload the contents of the newly specified address into the shift register 36 by repeating the shift register transfer cycle described above. If coincidence is present, however, the control logic 54 can quickly expose the next instruction word at the serial access port 34, making the word immediately available to the CPU 10. This is performed, as before, by switching the multiplexer 22 to couple the serial access port 34 to the data bus 20, and then generating a ready signal on the controller control bus 18. In addition, the above process is repeated by the controller 16 which again latches the address, pulses the serial clock input of the VRAM 12, and increments the latch contents. This again serves to prepare the sequentially next instruction word to be exposed at the serial access port 34, thereby always providing a cache-type lookahead capability for the CPU 10.

While the vast majority of memory accesses will follow the above scheme, a few special cases do occasionally occur. The first occurs when the instruction to be fetched "wraps around" the end of the shift register 36. In the preferred embodiment, this will occur whenever 256 instructions are accessed sequentially. A CY (carry) output of the incrementor 42 is used to flag this occurrence by detecting when the developed address value becomes an exact multiple of 256; the CY output directly sets the reload flag register. This will force a shift register transfer cycle to occur at the next instruction access, thus reloading the shift register 36 with a new row of the memory matrices 30.

The second special case occurs when the CPU 10 ceases to access instructions in the VRAM 12 for an extended period of time. The timer 56 detects this event. Each time the CPU 10 performs a VRAM instruction fetch, the timer 56 is reset. Upon reset, the timer 56 immediately begins to count. When the count reaches an amount corresponding to approximately 40 microseconds, without another intervening instruction request, a timeout signal is generated by the timer 56 which sets the reload flag register, causing the control logic 54 to force shift register transfer upon the next VRAM instruction access.

A method and main memory system have been disclosed for providing an effective processor cache that, due to the use of low-cost conventional VRAM components, can be adapted for use in microcomputer systems. The dual-port nature of VRAM components is uniquely exploited and tailored to the two types of information typically stored in memory, instructions and data, so that VRAM components can be broadly used as constituents of a main memory system.

With the method and system of the present invention, execution speed is greatly enhanced during cycles wherein the CPU 10 accesses instructions sequentially. Since the CPU 10 need not wait for a slow random access cycle to occur, it can operate without wait states. Indeed, since in practice shift register transfer cycles represent a very small portion of all memory accesses, overall system speed is greatly enhanced.

It will be appreciated by those skilled in the art that modifications to the foregoing preferred embodiment may be made in various aspects. The present invention is set forth with particularity in the appended claims. It is deemed that the spirit and scope of that invention encompasses such modifications and alterations to the preferred embodiment as would be apparent to one of ordinary skill in the art and familiar with the teachings of the present application.

I claim:

1. In a computer system having a CPU, a main memory system and a data bus interconnecting said CPU and said main memory system, said main memory system comprising:
    memory device means for storing information and having a first data port for providing random access to memory cells within said memory device means and a second data port coupled to a shift register within said memory device means, said shift register for being loaded with the contents of a row of said memory cells and further being able to sequentially expose each element of its contents at said second data port;
    multiplexer means for selecting either one of said data ports and for connecting said selected port to said data bus for providing said CPU with access to information stored in said memory device via said selected port; and
    controller means coupled to said memory device means for controlling said shift register and said multiplexer means.

2. In a computer having a CPU and a data bus, a main memory system, as recited in claim 1, wherein said controller means comprises:
    latch means for containing the address of a first, executed instruction word;
    incrementor means for receiving the contents of said latch means and developing an address value which corresponds to a second instruction word physically located upwardly adjacent to said first, executed instruction word;
    comparator means for evaluating a coincidence of said developed address value with the address of a requested instruction word; and
    means responsive to said comparator means for modifying the contents of said shift register.

3. In a computer system, having a CPU and a data bus, a main memory system, as recited in claim 1, wherein said memory device means comprises a plurality of dual-port random access memory devices.

4. In a computer system, having a CPU and a data bus, a main memory system, as recited in claim 1, wherein said memory device means comprises a plurality of video random access memory devices.

5. In a computer system having a CPU, a main memory system and a data bus interconnecting said CPU and said main memory system, said main memory system comprising:
    memory device means for storing information and having a first data port for providing random access to memory and a second data port coupled to a shift register within said memory device means, said shift register for being loaded with the contents of a row of said memory cells and for shifting its contents so as to sequentially expose each element of its contents at said second data port;
    multiplexer means for selecting either one of said data ports and for connecting said selected port to said data bus for providing said CPU with access to information stored in said memory device via said selected port;
    latch means for containing the address of a first instruction word;
    incrementor means for receiving the contents of said latch means and developing an address value which corresponds to a second instruction word;
    comparator means for evaluating a coincidence of said developed address value with the address of a presently requested instruction word; and
    means responsive to said comparator means for modifying the contents of said shift register.

6. A method for transferring a current instruction word from a main memory to a CPU comprising the steps of:
    comparing the address of said instruction word with the address of an instruction word that has been immediately, previously executed by said CPU to ensure that the address of said current instruction word is incrementally greater than the address of said immediately previously executed instruction word; and
    shifting the contents of a shift register priorly loaded with a row of memory words containing said instruction word to expose at a serial port coupled to said shift register said instruction word for transfer to said CPU.

7. A method for transferring a requested instruction word from a main memory to a CPU comprising the steps of:
    latching the address of a first instruction word;
    incrementing said latched address to develop an address value which corresponds to a second instruction word;
    comparing said developed address value to the address of said requested instruction word to ascertain whether a coincidence exists; and
    modifying the contents of a shift register based upon the outcome of said comparing step to expose at a serial port coupled to said shift register said requested instruction word for transfer to said CPU.

8. A method for transferring a requested instruction word from a main memory word to a CPU comprising the steps of:
    latching the address of a first, executed instruction word;

incrementing said latched address to develop an address value which corresponds to a second instruction word physically located upwardly adjacent to said first, executed instruction word;

comparing said developed address value to the address of said requested instruction word to ascertain whether a coincidence exists; and modifying the contents of a shift register based upon the outcome of said comparing step to expose at a serial port coupled to said shift register said requested instruction word for transfer to said CPU.

9. A method for transferring a requested instruction word from a main memory to a CPU, as recited in claim 8, wherein said modifying step, responsive to the outcome of said comparing step, comprises:

shifting the contents of said shift register to expose at said serial port said requested instruction word, in the presence of said coincidence; and loading said shift register with the contents of a row of memory words containing said requested instruction word, and shifting the contents of said shift register to expose at said serial port said requested instruction word, in the absence of said coincidence.

10. A method for transferring a requested instruction word from a main memory to a CPU, as recited in claim 8, wherein said modifying step in the presence of said coincidence comprises shifting the contents of said shift register to expose at said serial port said requested instruction word.

11. A method for transferring a requested instruction word from a main memory to a CPU, as recited in claim 8, wherein said modifying step in the absence of said coincidence comprises loading said shift register with the contents of a row of memory words containing said requested instruction word, and shifting the contents of said shift register to expose at said serial port said requested instruction word.

12. A main memory system for temporarily storing instructions and data in a computer system having a data bus interconnecting a CPU and said main memory system, said main memory system comprising:

a plurality of integrated circuit memory devices, each of said devices having a parallel data port for providing random access to memory cells therein and a serial data port coupled to a shift register therein, said shift register for being located with the contents of a row of memory cells and to shift its contents to sequentially expose each element of its contents at said serial data port;

means for selecting either one of said data ports and for coupling said selected data port to said data bus for providing said CPU with access to stored information via said selected data port; and means coupled to said devices and said means for selecting for controlling said shift register and said means for selecting.

13. A main memory system for temporarily storing instructions and data for processing in a computer system having a data bus interconnecting a CPU and said main memory system, said main memory system comprising:

a plurality of video random access memory integrated circuit devices arranged in a main memory array configuration, each of said devices having a parallel data port for providing random access to memory cells therein and a serial data port coupled to a shift register therein, said shift register for being loaded with the contents of a row of memory cells and to shift its contents to sequentially expose each element of its contents at said serial data port;

means for selecting either one of said data ports and for coupling said selected data port to said data bus for providing said CPU with access to stored information via said selected data port;

latch means for containing the address of a first, executed instruction word;

incrementor means for receiving the contents of said latch means and for developing an address value which corresponds to a second instruction word physically located upwardly adjacent to said first, executed instruction word;

comparator means for evaluating a coincidence of said developed address value with the address of a requested instruction word; and means responsive to said comparator means for modifying the contents of said shift register.

14. A main memory system for use in a computer system having a central processing unit for manipulating instructions and data temporarily stored in said main memory system, said main memory system having an associated, integral cache for expediting the retrieval of instructions from said main memory system, said main memory system comprising:

a plurality of integrated circuit memory devices, each of said devices having a parallel data port for providing random access to memory cells therein and a serial data port coupled to a shift register therein, said shift register for being loaded with the contents of a row of memory cells and to shift its contents to sequentially expose each element of its contents at said serial data port;

means for selecting either one of said data ports and for coupling said selected data port to a data bus coupled to said central processing unit to provide said central processing unit with access to stored information via said selected data port; and means for controlling said shift register and said means for selecting.

* * * * *